(12) United States Patent
Markel et al.

(10) Patent No.: US 7,734,640 B2
(45) Date of Patent: Jun. 8, 2010

(54) RESOURCE DISCOVERY AND ENUMERATION IN META-DATA DRIVEN INSTRUMENTATION

(75) Inventors: Arieh Markel, Broomfield, CO (US); Peter H. Schow, Longmont, CO (US)

(73) Assignee: Oracle America, Inc., Redwood Shores, CA (US)

( * ) Notice: Subject to any disclaimer, the term of this patent is extended or adjusted under 35 U.S.C. 154(b) by 554 days.

(21) Appl. No.: 11/473,098

(22) Filed: Jun. 22, 2006

(65) Prior Publication Data
US 2007/0299819 A1 Dec. 27, 2007

(51) Int. Cl.
*G06F 7/00* (2006.01)
(52) U.S. Cl. ............... 707/763; 707/758; 707/760; 707/769; 707/779; 709/230
(58) Field of Classification Search ................ 707/758, 707/760, 761, 763, 769, 779; 709/100
See application file for complete search history.

(56) References Cited

U.S. PATENT DOCUMENTS

| | | | |
|---|---|---|---|
| 6,167,405 A | | 12/2000 | Rosensteel, Jr. et al. |
| 6,999,956 B2 * | | 2/2006 | Mullins ........................ 707/2 |
| 7,290,244 B2 | | 10/2007 | Peck et al. |
| 2002/0091702 A1 | | 7/2002 | Mullins |
| 2003/0023518 A1 * | | 1/2003 | Spriggs et al. ................ 705/28 |
| 2003/0163298 A1 | | 8/2003 | Odom et al. |
| 2004/0044793 A1 | | 3/2004 | Pauly et al. |
| 2005/0165881 A1 | | 7/2005 | Brooks et al. |
| 2006/0236225 A1 * | | 10/2006 | Achilles et al. ............. 715/513 |
| 2007/0055643 A1 * | | 3/2007 | Iwatsu et al. .................. 707/1 |
| 2009/0080013 A1 | | 3/2009 | Sato et al. |

OTHER PUBLICATIONS

"CIM Tutorial"; Distributed Management Task Force, Inc. and WBEM Solutions, Inc.; www.wbernsolutions.com/tuitorials/CIM/; 2003; (105 pages).

* cited by examiner

*Primary Examiner*—Don Wong
*Assistant Examiner*—Tuan-Khanh Phan
(74) *Attorney, Agent, or Firm*—Osha • Liang LLP (57) ABSTRACT

A method for enumerating an asset includes receiving an enumeration request for enumerating an asset, obtaining a data acquisition (DAQ) definition associated with the enumeration request, translating the enumeration request from an information model format to a DAQ format, wherein the DAQ definition complies with the DAQ format, identifying an actual uniform resource identifier (URI) from the DAQ definition based on the enumeration request, where the URI identifies an enumeration mechanism, triggering a protocol handler associated with the enumeration mechanism, and obtaining information about at least one instance of the asset from the protocol handler.

17 Claims, 7 Drawing Sheets

RESOURCE DISCOVERY AND ENUMERATION IN META-DATA DRIVEN INSTRUMENTATION

CROSS-REFERENCE TO RELATED APPLICATIONS

The present application contains subject matter that may be related to the subject matter in the following U.S. patent applications, which are all assigned to a common assignee: "System and Method for Meta-data Driven Instrumentation" (Ser. No. 11/472,614) filed on Jun. 22, 2006; "System and Method for Meta-data Driven Instrumentation" (Ser. No. 11/472,928) filed on Jun. 22, 2006; "System and Method for Object-Oriented Meta-Data Driven instrumentation" (Ser. No. 11/473,099) filed on Jun. 22, 2006; "System and Method for Native-Asset-Interface Libraries for Instrumentation" (Ser. No. 11/472,614) filed on Jun. 22, 2006; "Asynchronous Events in Meta-Data Driven Instrumentation" (Ser. No. 11/473,100) filed on Jun. 22, 2006; "System and Method for Efficient Meta-Data Driven Instrumentation" (Ser. No. 11/476,660) filed on Jun. 22, 2006; and "System and Method for Mapping between Instrumentation and Information Model" (Ser. No. 11/473,197) filed on Jun. 22, 2006.

BACKGROUND

A network corresponds to an interconnection of more than one computer system. For example, one type of network is a home network. A home network may correspond to two or more personal computers that can exchange data with each other and the Internet. Different types of networks exist throughout society. For example, large organizations often have data centers, servers, and various personal computer systems to exchange information between users, and to provide processing power to a single user.

In order to provide such functionality, a network includes various types of hardware and software. For example, the hardware includes the computer systems (personal computers, servers, and other such computing devices), network interface hardware, interconnection mediums (e.g., cables, wireless signals, etc.) routers, switches, hubs, and other such hardware. The software is instructions for providing the functionality of the network. For example, the software may include operating systems, network specific applications, user applications, server applications, etc.

In order to keep a network operating properly, the network must be managed. Managing a network involves managing the different resources (i.e., hardware and software) of the network. Typically, a resource can be managed through an application programming interface (API) of the resource. An application programming interface is the interface that a resource provides in order to allow management requests for service and management data to be made of the resource by management applications. Specifically, a management application that has knowledge of the application programming interface of the resource can manage the resource by accessing the different functions and data available through the application programming interface of the resource.

SUMMARY

In general, in one aspect, the invention relates to a method for enumerating an asset. The method includes receiving an enumeration request for enumerating an asset, obtaining a data acquisition (DAQ) definition associated with the enumeration request, translating the enumeration request from an information model format to a DAQ format, wherein the DAQ definition complies with the DAQ format, identifying an actual uniform resource identifier (URI) from the DAQ definition based on the enumeration request, wherein the URI identifies an enumeration mechanism, triggering a protocol handler associated with the enumeration mechanism, and obtaining information about at least one instance of the asset from the protocol handler.

In general, in one aspect, the invention relates to a system for enumerating an asset. The system includes a DAQ definition, and a DAQ manager configured to receive an enumeration request for enumerating an asset, obtain the DAQ definition associated with the enumeration request, identify an actual uniform resource identifier (URI) from the DAQ definition based on the enumeration request, wherein the URI identifies an enumeration mechanism, trigger a protocol handler associated with the enumeration mechanism, and obtain information about at least one instance of the asset from the protocol handler, wherein the enumeration request is translated from an information model format to a DAQ format, wherein the DAQ definition complies with the DAQ format.

In general, in one aspect, the invention relates to a distributed computer system having a plurality of nodes for performing a method. The computer system includes receiving an enumeration request for enumerating an asset, obtaining a DAQ definition associated with the enumeration request, translating the enumeration request from an information model format to a DAQ format, wherein the DAQ definition complies with the DAQ format, identifying an actual uniform resource identifier (URI) from the DAQ definition based on the enumeration request, wherein the URI identifies an enumeration mechanism, triggering a protocol handler associated with the enumeration mechanism, and obtaining information about at least one instance of the asset from the protocol handler, wherein the protocol handler and the enumeration mechanism are distributed across one or more of the plurality of nodes.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for enumerating and discovering assets. Specifically, embodiments of the invention provide a mechanism for enumerating assets for management of different asset types. Enumerating an asset includes discovering new assets and identifying assets within a system. Managing an asset includes monitoring the asset, actively managing the asset, registering the asset, or performing any other function on the asset.

More specifically, embodiments of the invention abstract the application programming interface from the enumeration mechanism used for assets. Using the abstraction, a management application and information model can enumerate instances of an asset without knowing the application programming interface of the asset.

Figure 1:
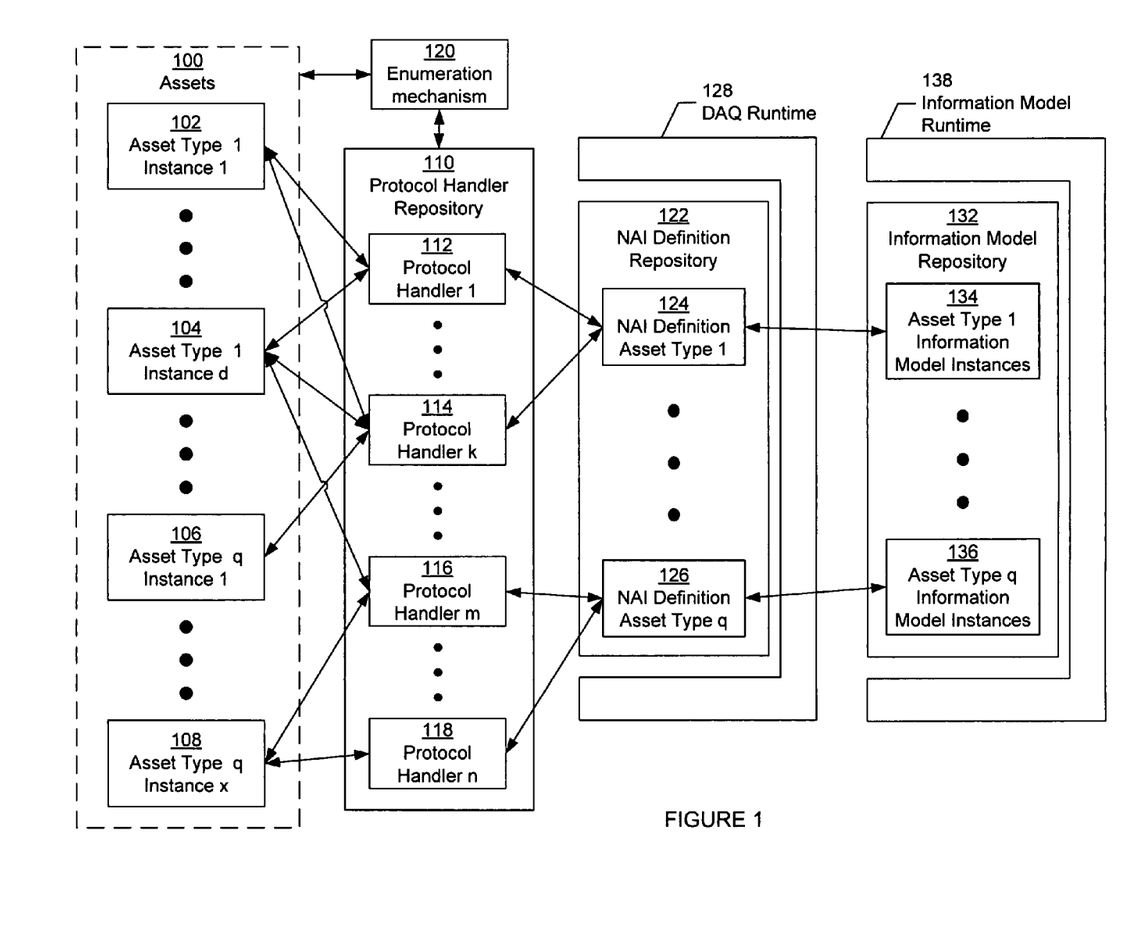
FIG. 1 shows a schematic diagram of a system for managing and enumerating assets in accordance with one or more embodiments of the invention.

FIG. 1 shows a schematic diagram of a system for managing assets in accordance with one or more embodiments of the invention. As shown in FIG. 1, the system includes assets (100), an enumeration mechanism (120), a protocol handler repository (110), a native asset interface (NAI) definition repository (122), a data acquisition (DAQ) runtime (128), an information model repository (132), and an information model runtime (138) in accordance with one or more embodiments of the invention. Each of these components is described below.

An asset (100) corresponds to any type of actual manageable resource in accordance with one or more embodiments of the invention. Specifically, asset (100) corresponds to the resources that are the object of the management. For example, an asset may correspond to software (e.g., operating system, database application, network application, or any other type of software) or hardware (e.g., computer systems, routers, switches, etc.).

One attribute of an asset (100) corresponds to the asset type. An asset type specifies a group of characteristics of the asset. The asset type may specify a type of operating system, a type of hardware, a type of server, etc. For example, if the asset is an operating system, then the asset type for the asset may correspond to a particular operating system, such as Solaris™ developed by Sun Microsystems™, Inc. (a trademark of Sun Microsystems, Inc. located in Santa Clara, Calif.). In one or more embodiments of the invention, assets that have the attribute of the same asset type have the same native asset interface (NAI) for managing the resources of the asset.

An NAI corresponds to a collection of instrumentation and control interfaces that is provided by the asset for the purposes of managing the asset. For example, an NAI may correspond to command line programs, files, simple network management protocol (SNMP), Intelligent Platform Management Interface (IPMI), etc.

An asset type may have one or more instances (e.g., asset type 1/instance 1 (102), asset type 1/instance d (104), asset type q/instance 1 (106), asset type q/instance x (108)) of the asset type. In particular, assets that are of the same asset type are called instances of the asset type. For example, as shown in FIG. 1, asset type 1 has at least two instances (e.g., asset type 1/instance 1 (102) and asset type 1/instance d (104)), while asset type q has at least two separate instances (e.g., asset type q/instance 1 (106) and asset type q/instance x (108)).

An enumeration mechanism (120) is connected to the assets (100) in accordance with one or more embodiments of the invention. The enumeration mechanism (120) corresponds to any type of mechanism that can enumerate assets (100). For example, the enumeration mechanism may correspond to a storage unit (e.g., database, file system, location of enumerable asset instances, etc.) and/or to a logical component, such as an enumeration service, discovery service, etc.

A protocol handler repository (110) is connected to the enumeration mechanism (120) and the assets (100) in accordance with one or more embodiments of the invention. A protocol handler repository (110) corresponds to a storage unit, such as a file system or library, for protocol handlers (e.g., protocol handler 1 (112), protocol handler k (114), protocol handler m (116), protocol handler n (118)).

In one or more embodiments of the invention, a protocol handler (e.g., protocol handler 1 (112), protocol handler k (114), protocol handler m (116), protocol handler n (118)) includes functionality to access the enumeration mechanism (120) and retrieve asset instances (e.g., asset type 1/instance 1 (102) and asset type 1/instance d (104)). In one or more embodiments of the invention, a protocol handler (e.g., protocol handler 1 (112), protocol handler k (114), protocol handler m (116), protocol handler n (118)) is created for using each type of enumeration mechanism required by the system. Specifically, if multiple enumeration mechanisms that require different protocols exist, then multiple protocol handlers may exist for each of the enumeration mechanisms. For example, one protocol handler may be designed for an enumeration mechanism corresponding to a database, while another separate protocol handler may exist for an enumeration mechanism corresponding to an enumeration service.

Further, in one or more embodiments of the invention, a protocol handler (e.g., protocol handler 1 (112), protocol handler k (114), protocol handler m (116), protocol handler n (118)) corresponds to a logical component that includes functionality to directly access the data, methods, and functions of an asset (100). Specifically, the protocol handler (e.g., protocol handler 1 (112), protocol handler k (114), protocol handler m (116), protocol handler n (118) includes functionality to use the NAI of the asset in order to manage the asset.

In one or more embodiments of the invention, each protocol handler (e.g., protocol handler 1 (112), protocol handler k (114), protocol handler m (116), protocol handler n (118)) is designed for a single protocol and/or NAI. For example, one protocol handler (e.g., protocol handler 1 (112), protocol handler k (114), protocol handler m (116), protocol handler n (118)) may include functionality to manage assets that use the SNMP, another protocol handler may be designed for IPMI, while another protocol handler may be designed for assets that are managed through Integrated Light Out Management (ILOM) developed by Sun Microsystems, Inc., and another protocol handler may manage assets that use the Network Time Protocol (NTP). In one or more embodiments of the invention, only one protocol handler exists for any single protocol. Those skilled in the art will appreciate that multiple protocol handlers may exist for any single protocol for redundancy purposes.

Because the protocol handlers are associated with a single protocol, each protocol handler (e.g., protocol handler 1 (112), protocol handler k (114), protocol handler m (116), protocol handler n (118)) is connected to one or more asset instance (e.g., asset type 1/instance 1 (102), asset type 1/instance d (104), asset type q/instance 1 (106), asset type q/instance x (108)) in accordance with one or more embodiments of the invention. Specifically, assets (100) that have at least one common NAI are connected to the same protocol handler regardless of whether the assets are of the same asset type.

Similarly, each asset instance (e.g., asset type 1/instance 1 (102), asset Type 1/instance d (104), asset type q/instance 1 (106), asset type q/instance x (108)) is connected to one or more protocol handlers (e.g., protocol handler 1(112), protocol handler k (114), protocol handler m (116), protocol handler n (118)) in accordance with one or more embodiments of the invention. Specifically, each asset instance (e.g., asset type 1/instance 1 (102), asset type 1/instance d (104), asset type q/instance 1 (106), asset type q/instance x (108)) may be accessed by one or more protocol handlers (e.g., protocol handler 1 (112), protocol handler k (114), protocol handler m (116), protocol handler n (118)) that correspond to the protocols for managing the asset.

In addition to the protocol handler repository (110), the system includes a NAI definition repository (122). A NAI definition repository (122) corresponds to a storage unit, such as a library or file system, for NAI definitions (e.g., NAI definition asset type 1 (124), NAI asset type q (126)). An NAI definition (e.g., NAI definition asset type 1 (124), NAI asset type q (126)) corresponds to an abstraction of the management components of an asset in accordance with one or more embodiments of the invention. Specifically, an NAI definition stipulates how data acquisition is performed and how data is populated for access. Moreover, an NAI definition (e.g., NAI definition asset type 1(124), NAI asset type q (126)) provides a common interface for defining the manageable components of the different assets. In one or more embodiments of the invention, each asset type has a single NAI definition (e.g., NAI definition asset type 1 (124), NAI asset type q (126)). Accordingly, the same NAI asset type definition may be used for multiple asset instances of the same asset type.

A data acquisition (DAQ) runtime (128) corresponds to a logical component that includes functionality to use a runtime binding of the NAI definition to manage the asset. Moreover, in one or more embodiments of the invention, the DAQ runtime (128) corresponds to the main focus of the system. Specifically, the DAQ runtime includes functionality to operate on NAI definitions (e.g., NAI definition asset type 1 (124), NAI asset type q (126)). The DAQ runtime (128), and the NAI definitions (e.g., NAI definition asset type 1(124), NAI asset type q (126)) are described in more detail in FIG. 3.

Continuing with FIG. 1, the NAI definitions (e.g., NAI definition asset type 1 (124), NAI asset type q (126)) are connected to an information model that includes the information model repository (132) and the information model runtime (138). An information model corresponds to a public interface for assets (100). The information model repository (132) corresponds to a storage unit for information model instances (e.g., asset type 1 information model instances (134), asset type q information model instances (136)). The information model instances (e.g., asset type 1 information model instances (134), asset type q information model instances (136)) are described in more detail in FIG. 2.

Continuing with the information model repository (132) of FIG. 1, the information model runtime (138) includes functionality to provide an execution environment for the information model repository (132). Specifically, the information model runtime (138) corresponds to the classes and methods of the information model during execution.

Figure 2:
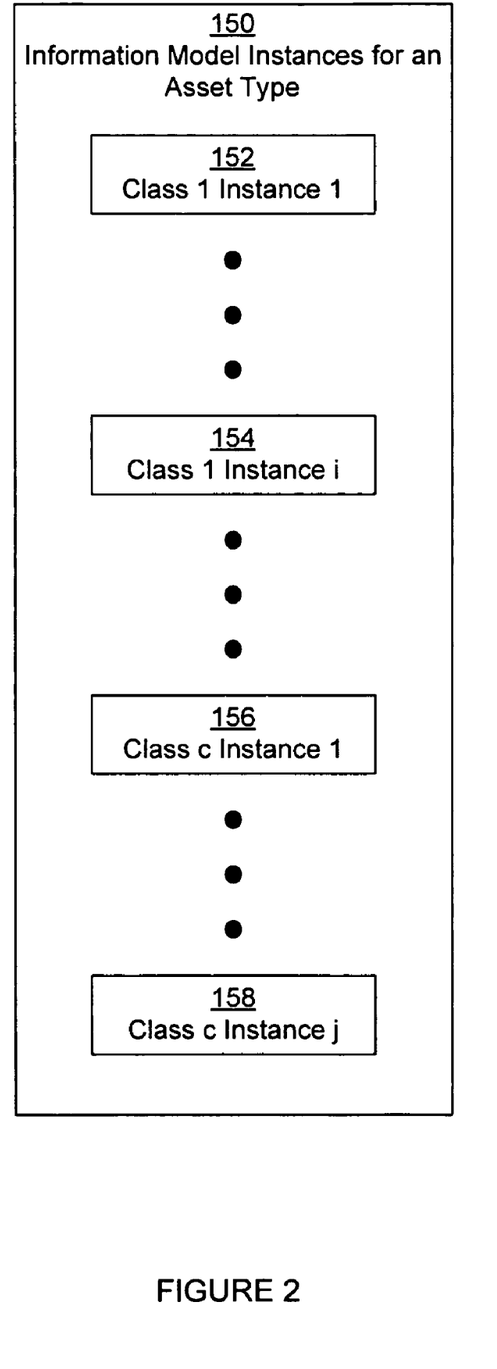
FIG. 2 shows a schematic diagram of information model instances for an asset type in accordance with one or more embodiments of the invention.

FIG. 2 shows a schematic diagram of information model instances for an asset type (150) in accordance with one or more embodiments of the invention. As shown in FIG. 2, each information model for an asset type includes multiple classes. A class corresponds to a collection of methods and properties that are common to a particular kind of component of the asset type. The method corresponds to the methods that can be used for managing an asset. The properties correspond to the manageable variables of an asset. For example, if the asset type is a particular type of server, a class may correspond to properties and methods for managing the operating system component for the particular type of server.

Each class includes multiple class instances (e.g., class 1/instance 1 (152), class 1/instance i (154), class c/instance 1 (156), class c/instance j (158)) in accordance with one or more embodiments of the invention. A class instance (e.g., class 1/instance 1 (152), class 1/instance i (154), class c/instance 1 (156), class c/instance j (158)) corresponds to an abstraction of an asset type instance in information model format. In one or more embodiments of the invention, the information model format corresponds to common information model (CIM) format (developed by Distributed Management Task Force, Inc. located in Portland, Oreg.). As shown in FIG. 2, the class instances (e.g., class 1/instance 1 (152), class 1/instance i (154), class c/instance 1 (156), class c/instance j (158)) for the information model may not be in a one to one relationship with the instances of the asset type for the class. In particular, some asset type instances may not have a corresponding instance for a particular information model class.

Each information model class instance (e.g., class 1/instance 1 (152), class 1/instance i (154), class c/instance 1 (156), class c/instance j (158)) is connected to a mapping specification (not shown) in accordance with one or more embodiments of the invention. The mapping specification includes functionality to map between the information model format and the DAQ format of the DAQ runtime. Accordingly, an information model class instance (e.g., class 1/instance 1 (152), class 1/instance i (154), class c/instance 1 (156), class c/instance j (158)) can enumerate the asset instances and manage virtually any asset without knowledge of the specific protocols used to manage the asset.

Alternatively, in one or more embodiments of the invention, each information model class instance (e.g., class 1/instance 1 (152), class 1/instance i (154), class c/instance 1 (156), class c/instance j (158)) may include the information required to format communication in the DAQ format in order to directly communicate with the DAQ runtime in accordance with one or more embodiments of the invention.

Figure 3:
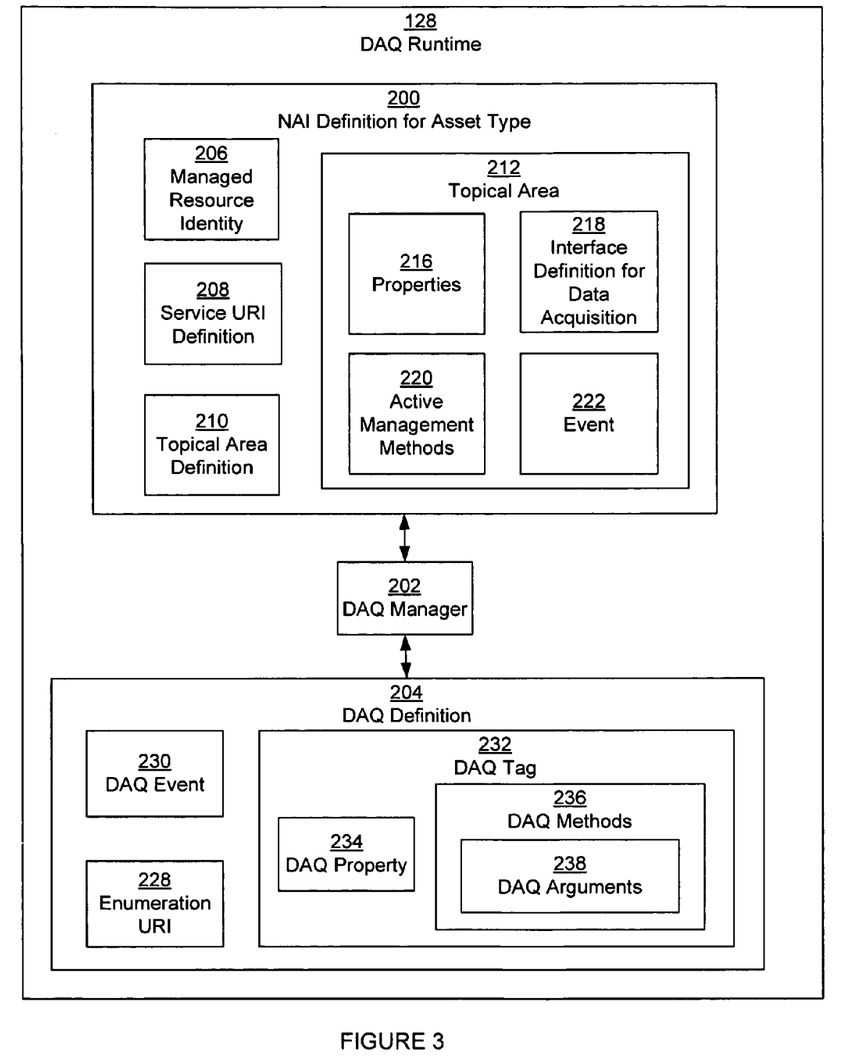
FIG. 3 shows a schematic diagram of a data acquisition runtime used for managing and enumerating assets in accordance with one or more embodiments of the invention.

FIG. 3 shows a schematic diagram of a DAQ runtime (128) used for enumerating and managing assets in accordance with one or more embodiments of the invention. As shown in FIG. 3, the DAQ runtime (128) includes an NAI definition for the asset type (200), a DAQ manager (202) and a DAQ definition (204) in accordance with one or more embodiments of the invention. Each of these components is described below.

An NAI definition for an asset type (200) corresponds to a description of the NAI for the asset. Specifically, for each manageable component of the asset type, the NAI definition defines how to enumerate and manage the component using the NAI of the component. In one or more embodiments of the invention, the NAI definition includes a scheme or protocol (e.g., SNMP, IPMI, etc.), and a part that defines how to execute the NAI in context of the protocol. For example, suppose that information about a computer system are gathered by a command line command "uname-a." Then the NAI definition may specify that the protocol is a shell, the location of the computer system, and the command "uname-a."

In one or more embodiments of the invention, the NAI definition for the asset type (200) defined using extensible markup language (XML). Specifically, the aforementioned components of the NAI definition are denoted by XML tags. Moreover, in one or more embodiments of the invention, the NAI definition complies with a predefined XML schema. The NAI definition for the asset type (200) includes a managed resource identity (206), a service uniform resource identifier (URI) definition (208), a topical area definition (210), and a topical area (212). Each of these components is described below.

The managed resource identity (206) corresponds to a definition of the asset type. Specifically, the managed resource identity (206) uniquely identifies the asset type in the NAI repository (not shown). In one or more embodiments of the invention, the managed resource identity (206) corresponds to an alpha-numeric identifier.

In addition to the managed resource identity (206), the NAI definition for the asset type (200) includes a service URI definition (208). The service URI definition (208) denotes how instances of the asset are enumerated. Specifically, the service URI definition (208) defines the enumeration mechanism (described in FIG. 1) for enumerating instances of the asset type.

In one or more embodiments of the invention, a service URI definition (208) corresponds to a relative URI for the enumeration mechanism. A relative URI corresponds to an URI with variables that are replaced to obtain the actual identifier of the enumeration service. For example, a relative URI may correspond to:

Sh://<hostname>/enumServicefolder/EnumScript

At runtime, the hostname variable may be replaced with the actual name of the host that has the enumeration script. Further, the above definition states that for enumerating instance of the asset type, a script (i.e., EnumScript) is to be used. In order to use the script, the example service URI definition includes the information that a protocol handler corresponding to "Sh" should be triggered.

By having the service URI definition (208) correspond to a relative URI, a developer can state how resources are discovered and enumerated without having to know the actual location of the enumeration service. Similarly, an administrator does not have to know how the enumeration service operates, rather the administrator only needs to specify the location for enumeration.

Alternatively, in one or more embodiments of the invention, rather than having the granularity of the enumeration mechanism on a per asset type basis (i.e., each asset type specify a single enumeration mechanism), the granularity of the enumeration mechanism may be on a per tag basis (i.e., each tag have an enumeration mechanism) or a single enumeration mechanism may exist for the entire set of assets.

Continuing with FIG. 3, the NAI definition for the asset type (200) also includes a topical area definition (210) in accordance with one or more embodiments of the invention. A topical area definition (210) identifies the different topical areas that can be managed for an asset type. For example, if the asset type is a computer system, then the topical area definition (210) may specify that the different manageable components of the asset type or topical areas of the asset type. For example, the topical areas may correspond to operating system, storage, networking, executing processes, or other such area.

In accordance with one or more embodiments of the invention, each topical area includes a topical area definition (212). The topical area definition (212) corresponds to a specification for managing the topical area. The topical area definition (212) includes properties (216), interface definitions for data acquisition (218), active management methods (220), and events (222). Each of these components is described below.

Properties (216) correspond to the information in the topical area about the asset type. Specifically, a property (216) corresponds to the information and data that can be set and obtained from an asset. For example, if the topical area corresponds to storage, then the properties may correspond to storage space, partitioning, amount of used space, etc. In one or more embodiments of the invention, the name of a property is unique within the namespace of the topical area. Further, in one or more embodiments of the invention, each property (216) includes a plurality of attributes. For example, the attributes of the property (216) may correspond to the name, a description, whether the property is able to be changed, the data type of values of the property, etc.

The interface definition for data acquisition (218) identifies how the properties (216) are populated in accordance with one or more embodiments of the invention. Specifically, the interface definition for data acquisition (218) specifies the scheme and method in the context of the scheme that is used to manage the asset in relation to the property. For example, the interface definition for data acquisition may correspond to snmp://target@host:port/1.3.6.2.1.1.1.*. The SNMP portion shows the scheme that is used to obtain a property as required by the NAI for the property is SNMP. The remainder portion of the example interface definition corresponds to the location for obtaining and setting the property on the asset.

Continuing with FIG. 3, the topical area definition (212) also includes active management methods (220). The active management methods (220) correspond to information about the methods that the NAI for the asset type provides in order to manage the asset by modification. For example, a method from the NAI may correspond to reset a particular value. The active management methods (220) identify how the value is reset. In one or more embodiment of the invention, active management methods (220) provide information for invoking the method for the NAI of the asset type.

Another component of the topical area definition (212) is an event (222). An event (222) corresponds to information for subscribing for notifications. Specifically, the NAI for the asset type generally includes mechanisms for receiving periodic notifications or only notification of changes. An event (222) corresponds to the definition of how to turn on the NAI for the notifications. For example, an event (222) may correspond to information about how to register for information about temperature.

In addition to the NAI definition for the asset type (200), the DAQ runtime (128) includes a DAQ definition (204) in accordance with one or more embodiments of the invention. A DAQ definition (204) corresponds to a runtime image of the NAI definition for the asset type (200). Specifically, the DAQ definition (204) corresponds to a runtime binding of the NAI definition for the asset type (200). For example, whereas in one or more embodiments of the invention, the NAI definition for the asset type (200) is in XML language, the DAQ definition (204) may correspond to an object oriented programming language. More specifically, a binding compiler (not shown) includes functionality to translate XML schema into one or more Java™ classes without requiring the developer to write complex parsing code. Moreover, in one or more embodiments of the invention, each DAQ definition (204) has the same names for the methods regardless of the different NAI definitions. Accordingly, the DAQ definition provides a common interface for each of the different asset types of the NAI definitions. In accordance with one or more embodiments of the invention, the DAQ definition (204) includes a DAQ event (230) and a DAQ tag (232).

A DAQ event (230) corresponds to a runtime binding of an event (222). Specifically, a DAQ event (230) includes functionality to compare an old value and new value for a property corresponding to the DAQ event (230). Further, the DAQ event includes functionality to register listeners for the DAQ event (230) and inform registered listeners of a current status (e.g., changes between the old and new value, no change, etc.) of the property associated with the DAQ event (230).

An enumeration URI (228) corresponds to a runtime binding of the service URI definition (208). In one or more embodiments of the invention, the enumeration URI (228) corresponds to the actual URI for the enumeration service. Specifically, the variables in the service URI definition (208) are replaced with actual values in the enumeration URI (228) in accordance with one or more embodiments of the invention.

A DAQ tag (232) corresponds to a runtime image of the topical area definition (212). Accordingly, those skilled in the art will appreciate that a DAQ tag (232) exists for each topical area definition (212) in accordance with one or more embodiments of the invention. The DAQ tag (232) includes a DAQ property (234) and DAQ methods (236).

A DAQ property (234) corresponds to a runtime image of the properties definition (216). Similarly, DAQ methods (236) correspond to a runtime image of the active management methods (220). The DAQ methods (236) include DAQ arguments (238). The DAQ arguments (238) correspond to the arguments required by the NAI methods of the asset. For example, if the NAI method for an asset corresponding to storage is to change the partitioning of the storage, then the DAQ arguments for a DAQ method of partitioning may specify how the storage devised is partitioned.

Interposed between the DAQ definition (204) and the NAI definition for an asset type (200) is a DAQ manager (202). The DAQ manager (202) corresponds to a logical engine that includes functionality to perform a runtime binding of the NAI definition for the asset type (200) with the DAQ definition (204) in accordance with one or more embodiments of the invention. Further, the DAQ manager (202) includes functionality to identify the DAQ definition (204) for a given management request and trigger the operations required using the DAQ definition (204) for managing the asset according to the management request.

For example, in one exemplary implementation of one or more embodiments of the invention, the DAQ runtime includes functionality to process request of type "get attributes," "set attributes," "invoke methods," and manage "event subscription" requests. Specifically, in one or more embodiments of the invention, the DAQ runtime includes functionality to obtain enumerated instances of an asset type using an enumeration URI. Using information about the enumerated instances, the DAQ runtime includes functionality to process the requests in the exemplary implementation as described below.

In one or more embodiments of the invention, in response to a get attribute request the runtime includes functionality to perform the following. Specifically, in response to the get attribute request, the runtime includes functionality to determine the DAQ tag where the attribute of interest is located by accessing the DAQ definition associated with the asset. The DAQ definition can be located via the assets NAI specification document, which is bound at execution time into the DAQ definition object. Next, the runtime includes functionality to obtain from the DAQ definition object the URI associated with the DAQ tag in accordance with one or more embodiments of the invention. Specifically, the DAQ tag includes the URI definition for the obtaining value of the attribute from the NAI of the asset in accordance with one or more embodiments of the invention. More specifically, by substituting information provided when enumerating instances of an asset type, the specific instance of an asset can be identified and managed. After obtaining the necessary information for identifying the NAI for the asset, the runtime includes functionality to query the protocol handler repository to obtain the protocol handler that corresponds to the URI associated with the DAQ tag in accordance with one or more embodiments of the invention. Finally, the runtime includes functionality to perform an invocation of the protocol handler to obtain the value of the required attribute.

Continuing with the example, in one or more embodiments of the invention, in response to a set attribute request the runtime includes functionality to perform the following. Specifically, in response to the set attribute request, the DAQ runtime includes functionality to determine the location of the DAQ tag for setting the attribute of interest. Determining the location may be performed by accessing the DAQ definition object associated with the asset in accordance with one or more embodiments of the invention. Next, the DAQ runtime includes functionality to obtain the URI associated with the DAQ tag from the DAQ definition object for the attribute in accordance with one or more embodiments of the invention. After obtaining the necessary information to set the attribute, the DAQ runtime includes functionality to query the protocol handler repository to obtain the protocol handler that corresponds to the URI associated with the DAQ tag in accordance with one or more embodiments of the invention. Finally, the DAQ runtime performs invocations of the protocol handler found in the library to set the attribute with the requested value.

Continuing with the example, in one or more embodiments of the invention, in response to an invoke method request the runtime includes functionality to perform the following. Specifically, in response to the invoke method request, the DAQ runtime includes functionality to determine the DAQ tag where the method of interest is located by accessing the DAQ definition associated with the asset. After determining the DAQ tag, the DAQ runtime includes functionality to obtain the URI associated with the method to be invoked from the DAQ definition object in accordance with one or more embodiments of the invention. Once the necessary information to invoke the method is obtained, the DAQ runtime includes functionality to query the protocol handler repository to obtain the protocol handler that corresponds to the URI associated with the DAQ tag in accordance with one or more embodiments of the invention. Finally, the DAQ runtime includes functionality to perform a method invocation operation on the protocol handler that executes the API for the method to be invoked.

Lastly in the example implementation, when the DAQ runtime receives an "event subscription" request, the DAQ runtime includes functionality to determine the DAQ tag for the subscription event of interest is located by accessing the DAQ definition associated with the asset. After determining the DAQ tag, the DAQ runtime includes functionality to obtain the URI associated with the DAQ tag from the DAQ definition object in accordance with one or more embodiments of the invention. Once the necessary information to invoke the method is obtained, the DAQ runtime includes functionality to query the protocol handler repository to obtain the protocol handler that corresponds to the URI associated with the DAQ tag in accordance with one or more embodiments of the invention. Finally, the DAQ runtime includes functionality to perform a subscription request operation using the protocol handler to obtain notification of events through the NAI of the asset.

As shown in the above example, the common interface through the DAQ allows for an information model to perform virtually any management functions on the asset that are exposed through the NAI of the asset without having the NAI of the asset in accordance with one or more embodiments of the invention. Specifically, using the aforementioned requests, virtually any management operation can be performed in accordance with one or more embodiments of the invention.

Figure 4:
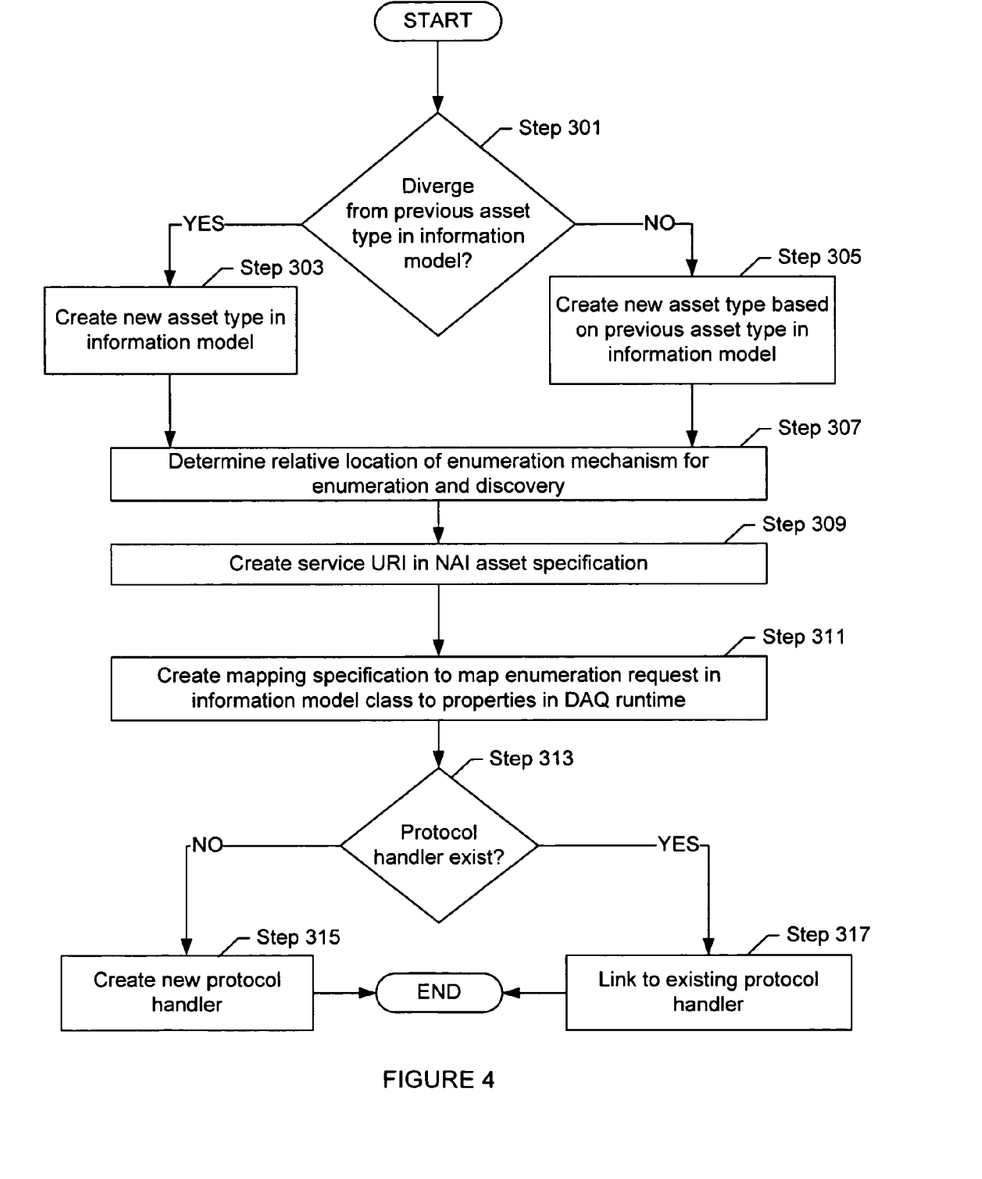
FIG. 4 shows a flowchart of a method for adding a new asset type to the system in accordance with one or more embodiments of the invention.

Also, using the DAQ runtime and the DAQ manager, new assets can be easily added to the system regardless of whether the new assets correspond to a preexisting asset type. If the new asset is of a preexisting asset type, then a new instance of the information model classes for the asset are created and information about the new asset instance is added to the DAQ. Alternatively, if the new asset is of a new asset type, then the system is configured to include the new asset type. FIG. 4 shows a flowchart of a method for adding a new asset type to the system in accordance with one or more embodiments of the invention.

Initially, a determination is made whether the new asset type diverges from a previous asset type in the information model (Step 301). A new asset type diverges from a previous asset type if the components of the new asset type (e.g., operating system, hardware, networking, etc.) are different than any existing asset type already defined in the information model in accordance with one or more embodiments of the invention. Determining whether a new asset diverges from a previously existing asset type can be performed by identifying the components of the new asset and comparing the components with the assets already in the information model.

If the new asset diverges from a previous asset type in the information model, then a new asset type is created in the information model (Step 303). Specifically, new classes are developed for managing the new asset of the new asset type.

Alternatively, if the new asset does not diverge from a previously existing asset, then a new asset type can be created from a previously existing asset type in the information model (Step 305). Specifically, any preexisting classes in the information model that can be used as a basis for the new asset type may be copied or inherited into the new classes.

After creating the new asset type, an instance of the newly developed classes is instantiated in the information model (not shown).

At this stage, the relative location of enumeration mechanisms for enumeration and discovery are determined (Step 307). Specifically, a developer may create an enumeration mechanism and set the enumeration mechanism in a folder. The relative location corresponds to the relative URI for the enumeration mechanism with respect to the folder in accordance with one or more embodiments of the invention. Accordingly, the enumeration mechanism may be found by accessing a knowledge base that contains the information.

Using the relative location of the enumeration mechanism, a service URI definition is created in the NAI asset specification (Step 309). Also, at this stage, the mechanisms for managing the manageable components of the asset are identified. Based on the manageable components, the NAI definition is developed. Specifically, for each mechanism for managing the asset, a definition is added to the NAI definition for the asset. More specifically, the tags are identified and the information within the tags is populated in accordance with one or more embodiments of the invention.

At any stage after creating the NAI definition and before the asset is managed, the DAQ manager may perform the runtime binding of the NAI definition to the DAQ definition. Performing the runtime binding may include, for example, parsing the NAI definition and creating a DAQ definition objects for managing the asset using the information in the NAI definition. Thus, the enumeration URI may be added to the DAQ.

In order to enumerate and manage the asset of the new asset type, the information model instance must be link to the NAI definition. Accordingly, the properties from the DAQ tier to populate the information model are determined based on the information model classes. Specifically, the procedures and enumeration mechanisms for populating the information model based on the NAI definition are identified.

Using the identified procedures and enumeration mechanisms, a mapping specification is created to map the properties in the information model class to the properties in the DAQ (Step 311). Creating the mapping specification may include identifying how the components of the information model correlate to the components of the DAQ. The mapping specification may then be created to reflect the correlation between components.

Continuing with FIG. 4, protocol handlers are also associated with the new asset type. Specifically, a determination is made whether the protocol handlers exist for the new asset type (Step 313). Determining whether protocol handlers exist for the new asset can be performed by identifying the enumeration mechanism and NAI for the asset type. Specifically, as part of the information about the asset of the new asset type or the configuration of the asset, the NAI, or interface for managing the asset type is revealed. The enumeration mechanism and NAI specifies the protocols or schemes that are required for managing the asset type. Based on the specified protocols or schemes, a protocol handler can be identified.

If a protocol handler does not exist for the new asset, then a new protocol handler is created (Step 315). Specifically, at this stage, a new protocol handler is developed for the new asset. Developing the protocol handler may include creating any classes or functions for the protocol handler in a programming language in accordance with one or more embodiments of the invention.

Alternatively, if a protocol handler already exists for the asset type, then a link to the protocol handler is created (Step 317). Specifically, the NAI definition in the DAQ runtime links to the protocol handler.

Figure 5:
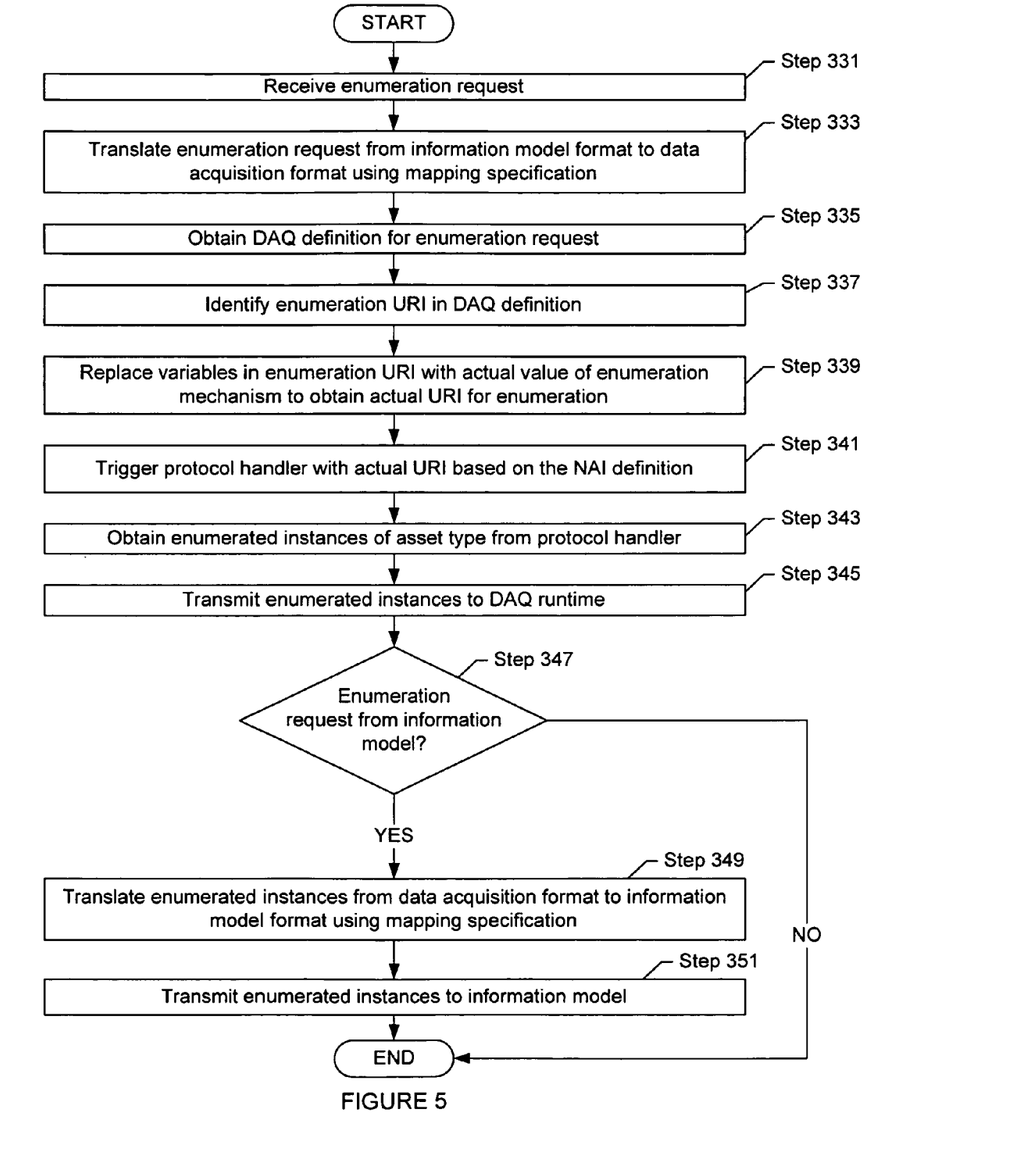
FIG. 5 shows a flowchart of a method for enumerating assets in accordance with one or more embodiments of the invention.

Once the mapping specification is created, the enumeration mechanism is identified, and the NAI definition is bound to the DAQ definition, the asset can be enumerated and managed according to management requests. FIG. 5 shows a flowchart of a method for enumerating assets in accordance with one or more embodiments of the invention.

Initially, an enumeration request is received (Step 331). The enumeration request may be originated by a management application or by an information model. In one or more embodiments of the invention, the enumeration request is in information model format.

According to the enumeration request, the information model class instance is accessed in the information model (not shown). In particular, the enumeration request may include an asset type identifier and/or a property identifier. Based on the identifiers and the type of request, information model asset type instance is identified and accessed. At this stage, the information model class instance may be triggered to perform the enumeration function.

By accessing the information model class instance, an API is called from the information model class instance (not shown). Specifically, the information model class instance includes a call to an API for enumerating the asset type or a tag of the asset type. The API may or may not have any resemblance to the NAI of the asset. In one or more embodiments of the invention, the call to the API is intercepted.

Once the NAI definition is identified, the request is translated from the information model format to the data acquisition format using the mapping specification (Step 333). Specifically, the parameters from the request are formatted according to the requirements of the DAQ, and the any remaining necessary formatting changes known in the art may be performed. For example, the information model formatted request may be formatted in an information model language. Accordingly, the language of the request may be translated to a format that a DAQ language can understand.

Alternatively, in one or more embodiments of the invention, rather than the enumeration request originating from the information model or management application, the enumeration request may originate by the DAQ runtime. In such scenario, the enumeration request does not necessarily need to be translated.

Continuing with FIG. 5, at this stage, the DAQ definition is obtained for the enumeration request via native asset interface definition that is bound to the DAQ definition (Step 335). Identifying the DAQ definition may be performed using virtually any technique known in the art. For example, a mapping specification may be queried for the DAQ definition corresponding to the enumeration request. Alternatively, the DAQ manager may determine the asset type of the management request to identify the DAQ definition for the management request.

Next, the enumeration URI is identified from the DAQ definition (Step 337). Identifying the enumeration URI may be performed by accessing the DAQ definition and the tag for the enumeration in accordance with one or more embodiments of the invention.

Once the enumeration URI is identified, variables in the enumeration URI are replaced with the actual values of the enumeration mechanism to obtain the actual URI for enumeration (Step 339). Those skilled in the art will appreciate that replacing the variables may be performed at virtually any time before the enumeration mechanism is actually accessed. For example, the variables may be replaced at compile time, runtime, by the protocol handler to determine the URI, etc.

Next, the protocol handler is triggered with the actual URI based on the DAQ definition (Step 341). Specifically, as previously stated, the DAQ definition identifies the protocol handlers and the mechanism for enumerating the asset using the protocol handlers. Based on the DAQ definition, the protocol handler is triggered with the information about the mechanism for the enumeration. For example, suppose the DAQ definition corresponds to the runtime binding of the following NAI definition Sh://aggie@bevo/enumService-folder/EnumScript. In such scenario, the protocol handler associated with the script protocol is invoked with the information to access the enum script from the location identified by: aggie@bevo/enumServiceFolder in accordance with one or more embodiments of the invention.

Accordingly, the enumeration mechanism is invoked using the protocol handler. Depending on the type of enumeration mechanism, the protocol handler may perform a variety of operations. For example, if the enumeration mechanism corresponds to a script, then the protocol handler may include functionality to perform the instructions specified in the script. In another example, if the enumeration mechanism corresponds to a file or database whereby assets register with the file or database, then the protocol handler may include functionality to access the file or database to obtain the instances.

Regardless of how the protocol handler operates, the protocol handler obtains enumerated instances (Step 343). Specifically, the protocol handler may obtain enumerated instances of an asset type or of a specific tag. The enumerated instances may be obtained as a collection of attributes (e.g., location, identifiers, etc.) of the instances.

Once the enumerated instances are obtained, then the enumerated instances are transmitted to the DAQ runtime (Step 345). At this stage, the protocol handler may return with a list of the attributes of the enumerated instances to populate the DAQ runtime.

After the enumerated instances are obtained, then a determination is made whether the enumeration request is received from an information model (Step 347). If the enumeration request is received from the information model, then the enumerated instances are translated from the data acquisition format to the information model format using the mapping specification (Step 349).

Once the enumerated instances are translated, then the enumerated instances are transmitted to the information model (Step 351). Specifically, the enumerated instances may be transmitted directly to the information model class instance that received or originated the enumeration request. Thus, the information model class instance may make populate the information model using the information about the enumerated instances.

Also, if the enumeration request originated from the management application, then the enumerated instances may be transmitted to the management application by the information model class instance.

As shown in FIG. 5, by using the DAQ definition and performing the translation, the information models, protocol handlers, and assets can be easily modified without unduly affecting the system. Specifically, the information model does not have to be aware of how to enumerate each asset. Accordingly, a variety of asset types can be enumerated without having to modify the management application or the information model.

Figure 6:
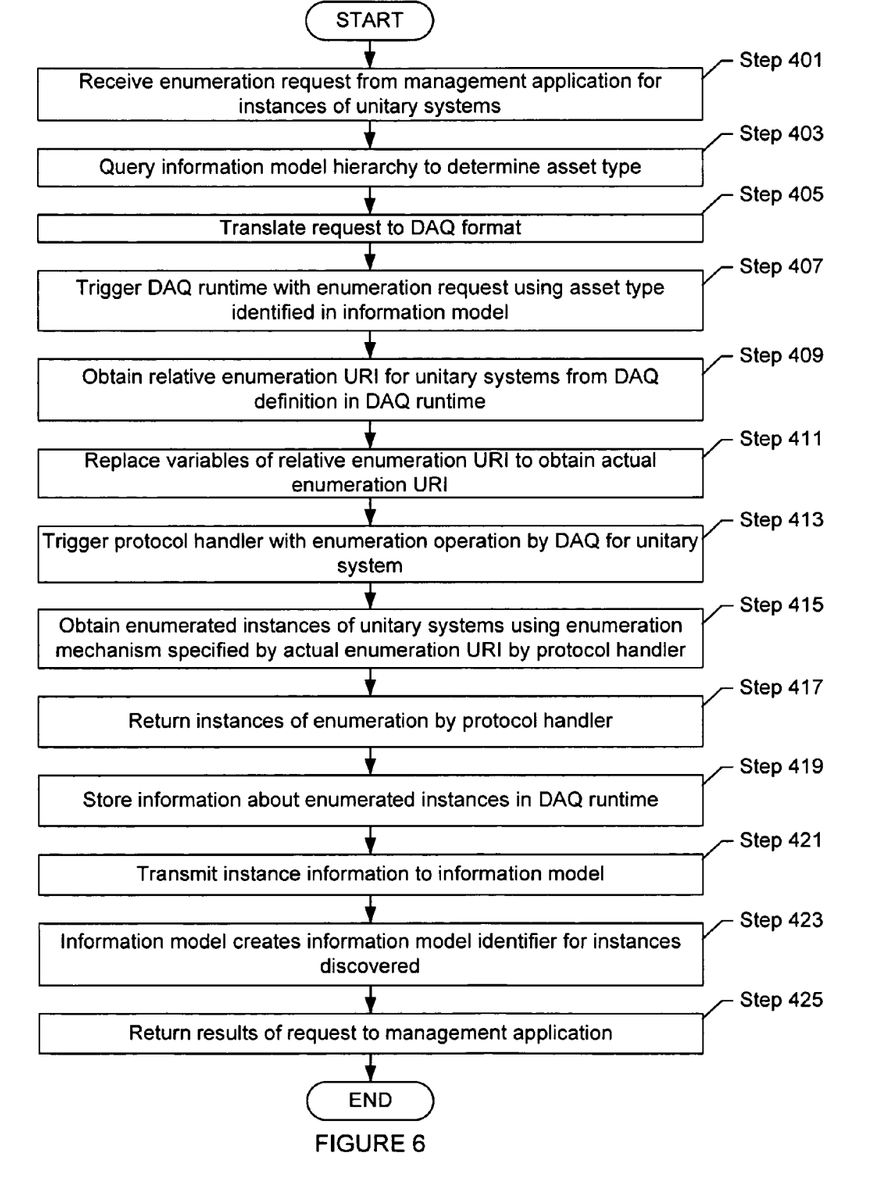
FIG. 6 shows a flowchart of an example of asset enumeration in accordance with one or more embodiments of the invention.

FIG. 6 shows a flowchart of an example of asset enumeration in accordance with one or more embodiments of the invention. In the following example, consider the case in which an administrator through a management application wants to know all of the instances of unitary systems (e.g., personal computers) on the network. Accordingly, the management application submits an enumeration request for unitary systems.

The enumeration request is received from the management application for instances of unitary systems (Step 401). After receiving the management request, the information model class hierarchy is queried to determine the asset type of the management request (Step 403). At this stage, the information model class instance for enumerating instances of the unitary system is invoked and the API called with the enumeration request. When intercepting the API call, the mapping specification translates the request into DAQ format (Step 405).

Also at this stage, the DAQ runtime is triggered with the enumeration request using the asset type identified in the information model (Step 407). Accordingly, the DAQ manager identifies the DAQ definition for the unitary systems in accordance with one or more embodiments of the invention.

After identifying the DAQ definition, the relative enumeration URI for unitary systems is obtained from the DAQ definition (Step 409). Further, variables in the relative enumeration URI are replaced with actual values to obtain the actual enumeration URI (Step 411). Based on the actual enumeration URI, the applicable protocol handler is triggered by the DAQ for unitary systems (Step 413).

Next, the enumerated instances of unitary systems are obtained by the protocol handler using the enumeration mechanism specified by the actual enumeration URI (Step 415). Specifically, the actual enumeration URI may specify a discovery service that can enumerate instances of unitary system, a database in which instances of unitary systems register, or any other such mechanism. Regardless, the enumeration mechanism for the unitary systems returns identification and information about the instances to the protocol handler.

Similarly, the protocol handler returns instances to the DAQ runtime (Step 417). At this stage, the DAQ runtime may store information about the enumerated instances in the DAQ definition (Step 419). Next, the instance information is transmitted to the information model (Step 421) in accordance with one or more embodiments of the invention. The information model then creates new information model class instances for any instances of unitary systems that are not already in the information model (Step 423).

Next, the information model runtime returns the instance information to the management application (Step 425). Thus, the administrator is able to easily identify all instances of unitary systems regardless of the NAI of the asset or the management application that is used.

Figure 7:
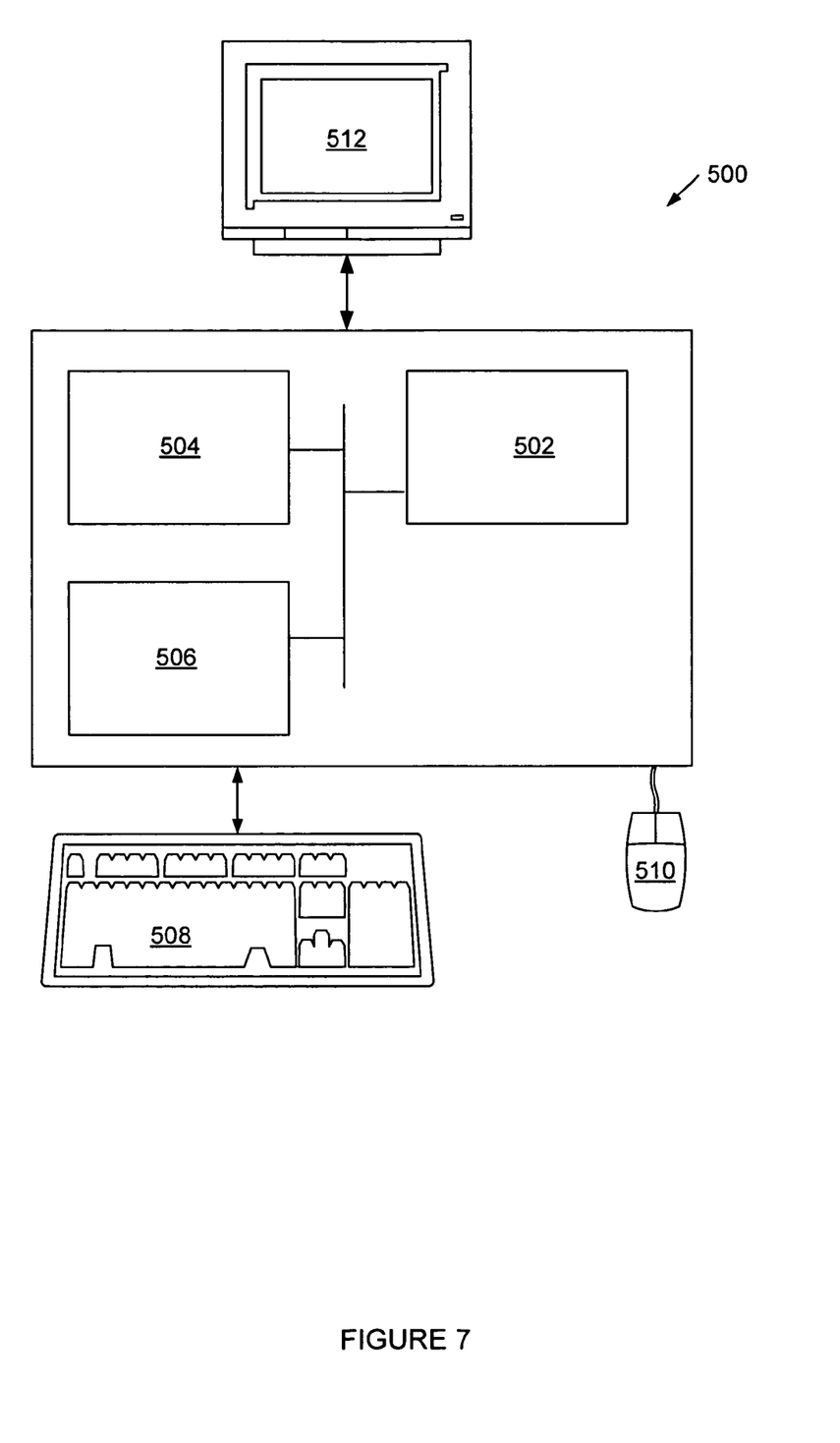
FIG. 7 shows a computer system in accordance with one or more embodiments of the invention.

The invention may be implemented on virtually any type of computer regardless of the platform being used. For example, as shown in FIG. 7, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., NAI definition, DAQ definition, Information model repository, protocol handler repository, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention provide an easy mechanism for enumerating assets. Specifically, embodiments of the invention minimize the amount of framework code required for enumerating an asset type or property. For example, by only adding metadata definitions to the DAQ runtime in the form of NAI definitions, new assets and new asset types can be easily added to the system. Specifically, when new asset types are added to the system, the information model may only be adjusted to include the new asset type. The information model does not have to be aware of the communication protocols for identifying instances of the new asset type.

Moreover, embodiments of the invention create an environment whereby a developer can create an enumeration mechanism without needing to be aware of where the enumeration mechanism will be stored. Specifically, by using a relative URI rather than an actual URI, the developer can specify the enumeration mechanism relative to virtually any location. Further, the developer can create the NAI definitions without needing to know where each component is within the system, such as the different subnets of the components. Accordingly, clients, administrators, and/or users can configure the system according to personal preference.

Further, embodiments of the invention provide a mechanism whereby the NAI for the asset can be updated as new technologies are developed without unduly affecting the management infrastructure. Specifically, if a protocol handler exists for the updated NAI, then only the definition needs to change for the asset.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for enumerating an asset using at least one processor, the method comprising:
   receiving an enumeration request for enumerating the asset;
   translating the enumeration request from an information model format to a data acquisition (DAQ) format to obtain a translated request;
   obtaining a DAQ definition from the translated request, wherein the DAQ definition complies with the DAQ format;
   identifying an actual uniform resource identifier (URI) from the DAQ definition, wherein the identifying is based on the enumeration request, wherein the actual URI comprises an identifier of an enumeration mechanism and an identifier of a protocol;
   triggering, according to the protocol, a protocol handler to enumerate the asset using the enumeration mechanism identified in the actual URI;
   obtaining information about at least one instance of the asset from the protocol handler after the protocol handler enumerates the asset;
   managing the at least one instance of the asset using the information, wherein the asset is at least one selected from a group consisting of a hardware component in a computer and software executing on the computer;
   determining a relative URI of the enumeration mechanism; and
   setting the relative URI in a native asset interface (NAI) definition before receiving the enumeration request, wherein the DAQ definition is a runtime binding of the NAI definition.

2. The method of claim 1, wherein the enumeration request specifies an asset type.

3. The method of claim 1, wherein the enumeration mechanism is a script.

4. The method of claim 1, further comprising: replacing a variable in the relative URI to obtain the actual URI.

5. The method of claim 1, further comprising:
   transmitting the information to a management application.

6. The method of claim 1, wherein the NAI definition is defined in extensible markup language.

7. The method of claim 1, further comprising:
identifying an asset type of the asset from an enumeration request, wherein the DAQ definition is based on the asset type.

8. A system for enumerating an asset comprising:
a processor;
a data acquisition (DAQ) definition;
a DAQ manager executing on the processor and configured to:
  receive an enumeration request for enumerating the asset;
  obtain the DAQ definition associated with the enumeration request;
  identify an actual uniform resource identifier (URI) from the DAQ definition, wherein the identifying is based on the enumeration request, wherein the URI comprises an identifier of an enumeration mechanism and an identifier of a protocol;
  trigger, according to the protocol, a protocol handler to enumerate the asset using the enumeration mechanism identified in the actual URI; and
  obtain information about at least one instance of the asset from the protocol handler after the protocol handler enumerates the asset; and
a developer environment configured to:
  determine a relative URI of the enumeration mechanism; and
  set the relative URI in an NAI definition before receiving the enumeration request, wherein the DAQ definition is a runtime binding of the NAI definition,
wherein an information model request is translated from an information model format to a DAQ format to obtain the enumeration request, wherein the DAQ definition complies with the DAQ format, and
wherein the at least one instance of the asset is managed using the information, wherein the asset is at least one selected from a group consisting of a hardware component in a computer and software executing on the computer.

9. The system of claim 8, wherein the enumeration request specifies an asset type.

10. The system of claim 8, wherein the enumeration mechanism is a script.

11. The system of claim 8, further comprising:
an administrator environment configured to:
  replace a variable in the relative URI to obtain the actual URI.

12. The system of claim 8, further comprising:
an information model runtime configured to:
  transmit the information to a management application.

13. The system of claim 8, wherein the NAI definition is in extensible markup language.

14. The system of claim 8, further comprising:
an information model runtime configured to translate the information model request from the information model format to the DAQ format.

15. A distributed computer system having a plurality of nodes, wherein at least one node of the plurality of nodes comprises a processor configured to execute instructions for performing a method, the method comprising:
receiving an enumeration request for enumerating an asset;
translating the enumeration request from an information model format to a data acquisition (DAQ) format to obtain a translated request;
obtaining a DAQ definition from the translated request, wherein the DAQ definition complies with the DAQ format;
identifying an actual uniform resource identifier (URI) from the DAQ definition, wherein the identifying is based on the enumeration request, wherein the actual URI comprises an identifier of an enumeration mechanism and an identifier of a protocol;
triggering, according to the protocol, a protocol handler to enumerate the asset using the enumeration mechanism identified in the actual URI;
obtaining information about at least one instance of the asset from the protocol handler after the protocol handler enumerates the asset;
managing the at least one instance of the asset using the information, wherein the asset is at least one selected from a group consisting of a hardware component in a computer and software executing on the computer;
determining a relative URI of the enumeration mechanism; and
setting the relative URI in a native asset interface (NAI) definition before receiving the enumeration request, wherein the DAQ definition is a runtime binding of the NAI definition,
wherein the protocol handler and the enumeration mechanism are distributed across one or more of the plurality of nodes.

16. The method of claim 1, wherein the enumeration request is received from a management application, wherein the enumeration request complies with the information model format, and wherein the method further comprises:
identifying an asset type of the asset from the enumeration request;
identifying a mapping specification entry matching the type of the asset, wherein the enumeration request is translated based on the mapping specification entry to create the translated request.

17. The method of claim 1, wherein the asset comprises at least one selected from a group consisting of an application and a hardware device, and wherein the DAQ definition is identified based on an asset type of the asset.

* * * * *